(12) United States Patent
Wang (10) Patent No.: US 10,383,154 B2
(45) Date of Patent: Aug. 13, 2019

(54) SIGNAL SENDING METHOD AND DEVICE

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 15/545,140

(22) PCT Filed: Jan. 20, 2015

(86) PCT No.: PCT/CN2015/071119
§ 371 (c)(1),
(2) Date: Jul. 20, 2017

(87) PCT Pub. No.: WO2016/115680
PCT Pub. Date: Jul. 28, 2016

(65) Prior Publication Data
US 2017/0367123 A1    Dec. 21, 2017

(51) Int. Cl.
*H04W 74/08* (2009.01)
*H04W 74/00* (2009.01)
*H04W 76/16* (2018.01)
*H04L 5/00* (2006.01)
*H04W 48/18* (2009.01)

(52) U.S. Cl.
CPC ....... *H04W 74/0858* (2013.01); *H04L 5/0007* (2013.01); *H04W 48/18* (2013.01); *H04W 74/0816* (2013.01); *H04W 76/16* (2018.02)

(58) Field of Classification Search
CPC ......... H04W 74/0858; H04W 74/0816; H04W 76/16; H04W 48/18; H04L 5/0007
See application file for complete search history.

(56) References Cited

U.S. PATENT DOCUMENTS

| | | | |
|---|---|---|---|
| 2008/0089222 A1 | 4/2008 | Kim et al. | |
| 2009/0129353 A1* | 5/2009 | Ki | H04W 74/0816 370/338 |
| 2011/0252158 A1 | 10/2011 | Feng et al. | |
| 2016/0143014 A1* | 5/2016 | Mukherjee | H04W 74/0816 370/330 |

(Continued)

FOREIGN PATENT DOCUMENTS

| | | |
|---|---|---|
| CN | 101162929 A | 4/2008 |
| CN | 101534230 A | 9/2009 |

(Continued)

OTHER PUBLICATIONS

Samsung, "Discussion on Channel Access Mechanisms for LAA," 3GPP TSG RAN1 #79, R1-144739, San Francisco, USA, Nov. 17-21, 2014, 6 pages.

(Continued)

*Primary Examiner* — Kiet Tang
(74) *Attorney, Agent, or Firm* — Slater Matsil, LLP (57) ABSTRACT

Embodiments provide a signal sending method and a device, and relates to the communications field. The method includes determining, by a device, whether a CCA end moment is a first signal sending moment; and if the CCA end moment is the first signal sending moment, sending, by the device, a signal at the first signal sending moment. The present invention is used for signal sending.

16 Claims, 5 Drawing Sheets

(56) References Cited

U.S. PATENT DOCUMENTS

2016/0212764 A1\* 7/2016 Yin .................... H04W 74/002

FOREIGN PATENT DOCUMENTS

| CN | 101873710 A | 10/2010 |
|----|---|---|
| CN | 102970737 A | 3/2013 |
| WO | 2007040669 A2 | 4/2007 |

OTHER PUBLICATIONS

ZTE, "Frame structure design for LAA considering LBT," 3GPP TSG RAN WG1 Meeting #79, R1-144828, San Francisco, USA, Nov. 17-21, 2014, 6 pages.

CMCC, "Discussion on possible solutions for LAA," 3GPP TSG-RAN WG1 #79, R1-144940, San Francisco, USA, Nov. 17-21, 2014, 6 pages.

\* cited by examiner

SIGNAL SENDING METHOD AND DEVICE

CROSS-REFERENCE TO RELATED APPLICATIONS

This application is a national stage of International Application No. PCT/CN2015/071119, filed on Jan. 20, 2015, which is hereby incorporated by reference in its entirety.

TECHNICAL FIELD

The present invention relates to the communications field, and in particular, to a signal sending method and a device.

BACKGROUND

In a wireless network system, before occupying an unlicensed carrier channel to send a signal, a transmission node in a network needs to listen to the channel, and after detecting that the channel is idle, the transmission node occupies the channel to send the signal. For example, in an LAA-LTE (Licensed Assisted Access Using Long Term Evolution) system, when using channel resources in an LBT (Listen Before Talk) manner, a device needs to first listen to a channel. A process of determining whether the channel is idle is referred to as a CCA (Channel clearance Assessment), and a minimal time unit of a channel assessment is referred to as a CCA cycle.

In the LAA-LTE system, before sending data, the device needs to detect, by means of listening by repeatedly using the CCA, that a channel is idle, so that the device can start to send the data. If multiple devices simultaneously detect, by means of listening, the channel is idle and simultaneously send data, a channel occupancy collision is caused.

SUMMARY

Embodiments of the present invention provide a signal sending method and a device, so as to resolve a prior-art problem that a channel occupancy collision is caused if multiple devices simultaneously detect, by means of listening, that a channel is idle and simultaneously send data.

To resolve the foregoing problem, the following technical solutions are used in the present invention:

According to a first aspect, a signal sending method is provided. The method includes determining, by a device, a first value. The method also includes determining, by the device, a first signal sending moment according to the first value. The method also includes determining, by the device, whether a clear channel assessment CCA end moment is the first signal sending moment. The method also includes, when the clear channel assessment CCA end moment is the first signal sending moment, sending, by the device, a signal at the first signal sending moment.

With reference to the first aspect, in a first possible implementation of the first aspect, the determining, by the device, a first signal sending moment according to the first value includes: calculating, by the device, $X_1$ according to a formula $X_1=\mod(X,N)$; dividing, by the device, 0, 1, . . . , N−1 into M groups, where each group is corresponding to a signal sending moment; and selecting, by the device, a signal sending moment of a group in which $X_1$ is located as the first signal sending moment, where mod(is a modulo function, X is the first value, N is a positive integer greater than 1, X and M are positive integers, and N≥M.

With reference to the first possible implementation of the first aspect, in a second possible implementation of the first aspect, N is 7, and M is 2; a first group includes {0, 1, 2}, and a signal sending moment corresponding to the first group is Y=7×floor(X/N)+2; and a second group includes {3, 4, 5, 6}, and a signal sending moment corresponding to the second group is Y=7×floor(X/N)+6, where floor( ) is a floor function.

With reference to the first possible implementation of the first aspect, in a third possible implementation of the first aspect, N is 7, and M is 3; a first group includes {0}, and a signal sending moment corresponding to the first group is Y=7×floor(X/N); a second group includes {1, 2, 3}, and a signal sending moment corresponding to the second group is Y=7×floor(X/N)+3; and a third group includes {4, 5, 6}, and a signal sending moment corresponding to the third group is Y=7×floor(X/N)+7, where floor( ) is a floor function.

With reference to any one of the first aspect, or the first to the third possible implementations of the first aspect, in a fourth possible implementation of the first aspect, the method further includes: if the clear channel assessment CCA end moment is not the first signal sending moment, re-performing, by the device, a clear channel assessment CCA; if an assessment result of the clear channel assessment CCA is that a channel is idle, determining, by the device, whether the clear channel assessment CCA end moment is the first signal sending moment; and if the clear channel assessment CCA end moment is the first signal sending moment, sending, by the device, the signal at the first signal sending moment.

With reference to any one of the first aspect, or the first to the third possible implementations of the first aspect, in a fifth possible implementation of the first aspect, the method further includes: if the clear channel assessment CCA end moment is not the first signal sending moment, re-performing, by the device, a clear channel assessment CCA; and if an assessment result of the clear channel assessment CCA is that a channel is not idle, the determining, by a device, a first value includes: increasing, by the device, the first value by 1.

According to a second aspect, a signal sending method is provided. The method also includes performing, by a device, seven clear channel assessments CCAs in two consecutive orthogonal frequency division multiplexing OFDM symbols, or performing four clear channel assessments CCAs in one orthogonal frequency division multiplexing OFDM symbol. The method also includes, when an assessment result of a clear channel assessment CCA meets a signal sending condition, sending, by the device, a signal.

With reference to the second aspect, in a first possible implementation of the second aspect, if one of the two OFDM symbols includes 2208 sampling time points Tss, and the other OFDM symbol includes 2192 sampling time points Tss, a time length of one clear channel assessment CCA in the seven clear channel assessments CCAs is 656 sampling time points Tss, and a time length of each of the remaining six clear channel assessments CCAs is 624 sampling time points Tss.

With reference to the second aspect, in a second possible implementation of the second aspect, if each of the two OFDM symbols includes 2192 sampling time points Tss, a time length of one clear channel assessment CCA in the seven clear channel assessments CCAs is 640 sampling time points Tss, and a time length of each of the remaining six clear channel assessments CCAs is 624 sampling time points Tss.

With reference to the second aspect, in a third possible implementation of the second aspect, if the OFDM symbol includes 2560 sampling time points Tss, a time length of one clear channel assessment CCA in the four clear channel assessments CCAs is 688 sampling time points Tss, and a time length of each of the remaining three clear channel assessments CCAs is 624 sampling time points Tss.

With reference to any one of the second aspect, or the first to the third possible implementations of the second aspect, in a fourth possible implementation of the second aspect, a moment at which the device sends the signal is different from a moment at which another device sends the signal.

With reference to the fourth possible implementation of the second aspect, in a fifth possible implementation of the second aspect, an interval between the moment at which the device sends the signal and the moment at which the another device sends the signal is one CCA cycle.

According to a third aspect, a device includes a channel assessment unit, configured to determine a first value, and determine a first signal sending moment according to the first value. The device also includes a determining unit, configured to determine whether a clear channel assessment CCA end moment is the first signal sending moment determined by the channel assessment unit. The device also includes a sending unit, configured to: when a result determined by the determining unit is that the clear channel assessment CCA end moment is the first signal sending moment, send a signal at the first signal sending moment.

With reference to the third aspect, in a first possible implementation of the third aspect, the channel assessment unit is specifically configured to: calculate $X_1$ according to a formula $X_1=\mod(X,N)$; divide 0, 1, . . . , N−1 into M groups, where each group is corresponding to a signal sending moment; and select a signal sending moment of a group in which $X_1$ is located as the first signal sending moment, where mod( ) is a modulo function, X is the first value, N is a positive integer greater than 1, X and M are positive integers, and N≥M.

With reference to the first possible implementation of the third aspect, in a second possible implementation of the third aspect, N is 7, and M is 2; a first group includes {0, 1, 2}, and a signal sending moment corresponding to the first group is Y=7×floor(X/N)+2; and a second group includes {3, 4, 5, 6}, and a signal sending moment corresponding to the second group is Y=7×floor(X/N)+6, where floor( ) is a floor function.

With reference to the first possible implementation of the third aspect, in a third possible implementation of the third aspect, N is 7, and M is 3; a first group includes {0}, and a signal sending moment corresponding to the first group is Y=7×floor(X/N); a second group includes {1, 2, 3}, and a signal sending moment corresponding to the second group is Y=7×floor(X/N)+3; and a third group includes {4, 5, 6}, and a signal sending moment corresponding to the third group is Y=7×floor(X/N)+7, where floor( ) is a floor function.

With reference to any one of the third aspect, or the first to the third possible implementations of the third aspect, in a fourth possible implementation of the third aspect, the channel assessment unit is further configured to: when the clear channel assessment CCA end moment is not the first signal sending moment, re-perform a clear channel assessment; the determining unit is further configured to: when an assessment result of the channel assessment unit is that a channel is idle, determine whether the clear channel assessment CCA end moment is the first signal sending moment; and the sending unit is further configured to: when the result determined by the determining unit is that the clear channel assessment CCA end moment is the first signal sending moment, send the signal at the first signal sending moment.

With reference to any one of the third aspect, or the first to the third possible implementations of the third aspect, in a fifth possible implementation of the third aspect, the channel assessment unit is further configured to: when the clear channel assessment CCA end moment is not the first signal sending moment, re-perform a clear channel assessment; and if an assessment result of the clear channel assessment CCA is that a channel is not idle, increase the first value by 1.

According to a fourth aspect, a device includes a channel assessment unit, configured to: perform seven clear channel assessments CCAs in two consecutive orthogonal frequency division multiplexing OFDM symbols, or perform four clear channel assessments CCAs in one orthogonal frequency division multiplexing OFDM symbol. The device also includes a sending unit, configured to: when an assessment result of the channel assessment unit meets a signal sending condition, send a signal.

With reference to the fourth aspect, in a first possible implementation of the fourth aspect, if one of the two OFDM symbols includes 2208 sampling time points Tss, and the other OFDM symbol includes 2192 sampling time points Tss, a time length of one clear channel assessment CCA in the seven clear channel assessments CCAs is 656 sampling time points Tss, and a time length of each of the remaining six clear channel assessments CCAs is 624 sampling time points Tss.

With reference to the fourth aspect, in a second possible implementation of the fourth aspect, if each of the two OFDM symbols includes 2192 sampling time points Tss, a time length of one clear channel assessment CCA in the seven clear channel assessments CCAs is 640 sampling time points Tss, and a time length of each of the remaining six clear channel assessments CCAs is 624 sampling time points Tss.

With reference to the fourth aspect, in a third possible implementation of the fourth aspect, if the OFDM symbol includes 2560 sampling time points Tss, a time length of one clear channel assessment CCA in the four clear channel assessments CCAs is 688 sampling time points Tss, and a time length of each of the remaining three clear channel assessments CCAs is 624 sampling time points Tss.

With reference to any one of the fourth aspect, or the first to the third possible implementations of the fourth aspect, in a fourth possible implementation of the fourth aspect, a moment at which the device sends the signal is different from a moment at which another device sends the signal.

With reference to the fourth possible implementation of the fourth aspect, in a fifth possible implementation of the fourth aspect, an interval between the moment at which the device sends the signal and the moment at which the another device sends the signal is one CCA cycle.

According to a fifth aspect, a device includes a processor, a memory, a bus, and a transmitter, where the processor, the memory, and the transmitter are connected to each other by using the bus; the processor is configured to: determine a first value, and determine a first signal sending moment according to the first value; and determine whether a clear channel assessment CCA end moment is the first signal sending moment; and the transmitter is configured to: when a result determined by the processor is that the clear channel assessment CCA end moment is the first signal sending moment, send a signal at the first signal sending moment.

With reference to the fifth aspect, in a first possible implementation of the fifth aspect, the processor is specifically configured to: calculate $X_1$ according to a formula $X_1=\mod(X,N)$; divide 0, 1, . . . , N−1 into M groups, where each group is corresponding to a signal sending moment; and select a signal sending moment of a group in which $X_1$ is located as the first signal sending moment, where mod(is a modulo function, X is the first value, N is a positive integer greater than 1, X and M are positive integers, and N≥M.

With reference to the first possible implementation of the fifth aspect, in a second possible implementation of the fifth aspect, N is 7, and M is 2; a first group includes {0, 1, 2}, and a signal sending moment corresponding to the first group is Y=7×floor(X/N)+2; and a second group includes {3, 4, 5, 6}, and a signal sending moment corresponding to the second group is Y=7×floor(X/N)+6, where floor( ) is a floor function.

With reference to the first possible implementation of the fifth aspect, in a third possible implementation of the fifth aspect, N is 7, and M is 3; a first group includes {0}, and a signal sending moment corresponding to the first group is Y=7×floor(X/N); a second group includes {1, 2, 3}, and a signal sending moment corresponding to the second group is Y=7×floor(X/N)+3; and a third group includes {4, 5, 6}, and a signal sending moment corresponding to the third group is Y=7×floor(X/N)+7, where floor( ) is a floor function.

With reference to any one of the fifth aspect, or the first to the third possible implementations of the fifth aspect, in a fourth possible implementation of the fifth aspect, the processor is further configured to: when the clear channel assessment CCA end moment is not the first signal sending moment, re-perform a clear channel assessment; and when an assessment result of the clear channel assessment CCA is that a channel is idle, determine whether the clear channel assessment CCA end moment is the first signal sending moment; and the transmitter is further configured to: when the result determined by the processor is that the clear channel assessment CCA end moment is the first signal sending moment, send the signal at the first signal sending moment.

With reference to any one of the fifth aspect, or the first to the third possible implementations of the fifth aspect, in a fifth possible implementation of the fifth aspect, the processor is further configured to: when the clear channel assessment CCA end moment is not the first signal sending moment, re-perform a clear channel assessment; and if an assessment result of the clear channel assessment CCA is that a channel is not idle, increase the first value by 1.

According to a sixth aspect, a device includes a processor, a memory, a bus, and a transmitter, where the processor, the memory, and the transmitter are connected to each other by using the bus. The processor is configured to: perform seven clear channel assessments CCAs in two consecutive orthogonal frequency division multiplexing OFDM symbols, or perform four clear channel assessments CCAs in one orthogonal frequency division multiplexing OFDM symbol. The transmitter is configured to, when an assessment result of the processor meets a signal sending condition, send a signal.

With reference to the sixth aspect, in a first possible implementation of the sixth aspect, if one of the two OFDM symbols includes 2208 sampling time points Tss, and the other OFDM symbol includes 2192 sampling time points Tss, a time length of one clear channel assessment CCA in the seven clear channel assessments CCAs is 656 sampling time points Tss, and a time length of each of the remaining six clear channel assessments CCAs is 624 sampling time points Tss.

With reference to the sixth aspect, in a second possible implementation of the sixth aspect, if each of the two OFDM symbols includes 2192 sampling time points Tss, a time length of one clear channel assessment CCA in the seven clear channel assessments CCAs is 640 sampling time points Tss, and a time length of each of the remaining six clear channel assessments CCAs is 624 sampling time points Tss.

With reference to the sixth aspect, in a third possible implementation of the sixth aspect, if the OFDM symbol includes 2560 sampling time points Tss, a time length of one clear channel assessment CCA in the four clear channel assessments CCAs is 688 sampling time points Tss, and a time length of each of the remaining three clear channel assessments CCAs is 624 sampling time points Tss.

With reference to any one of the sixth aspect, or the first to the third possible implementations of the sixth aspect, in a fourth possible implementation of the sixth aspect, a moment at which the device sends the signal is different from a moment at which another device sends the signal.

With reference to the fourth possible implementation of the sixth aspect, in a fifth possible implementation of the sixth aspect, an interval between the moment at which the device sends the signal and the moment at which the another device sends the signal is one CCA cycle.

According to the signal sending method and the device that are provided in the embodiments of the present invention, the device determines a first value; the device determines a first signal sending moment according to the first value; the device determines whether a CCA end moment is the first signal sending moment; and if the CCA end moment is the first signal sending moment, the device sends a signal at the first signal sending moment. Because whether the CCA end moment is the first sending moment is determined before the signal is sent, a prior-art problem that a channel occupancy collision is caused if multiple devices simultaneously detect, by means of listening, that a channel is idle and simultaneously send data is resolved.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), Universal Mobile Telecommunications System (UMTS), and a Worldwide Interoperability for Microwave Access (WiMAX) communications system.

It should be understood that, in the embodiments of the present invention, equipment (User Equipment, UE for short) includes but is not limited to a mobile station (MS for short), a mobile terminal, a mobile telephone, a handset, a portable equipment, and the like. The user equipment may communicate with one or more core networks by using a radio access network (RAN for short). For example, the user equipment may be a mobile telephone (or referred to as a "cellular" phone), or a computer having a wireless communication function; or the user equipment may further be a portable, pocket-sized, handheld, computer built-in, or in-vehicle mobile apparatus.

In the embodiments of the present invention, a device may be a base station (Base Transceiver Station, BTS for short) in GSM or CDMA, or may be a NodeB in WCDMA, or may be an evolved NodeB (eNB or e-NodeB for short) in LTE. This is not limited in the embodiments of the present invention.

It should be noted that, in the embodiments of the present invention, "first" and "second" are merely used for differentiation, instead of imposing a limitation in the embodiments of the present invention.

Figure 1:
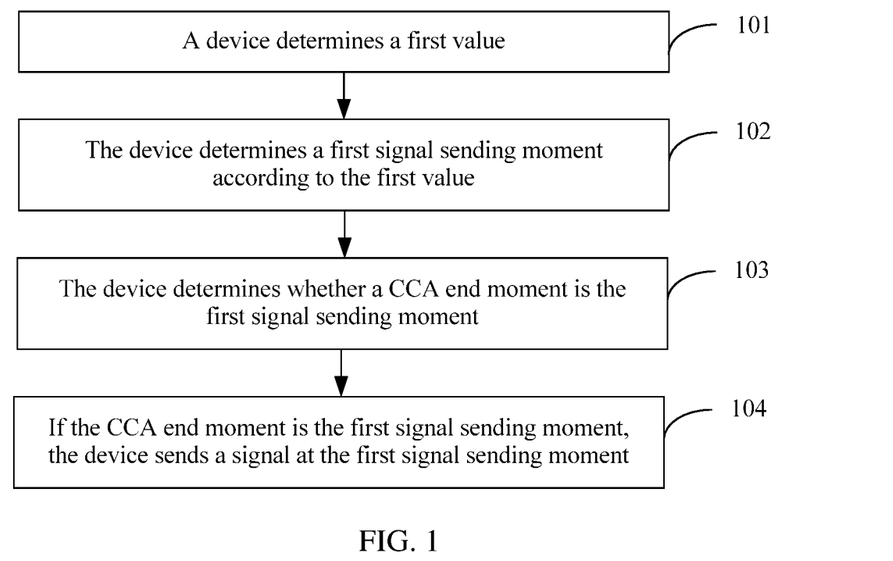
FIG. 1 is a schematic flowchart of a signal sending method according to an embodiment of the present invention.

An embodiment of the present invention provides a signal sending method. Optionally, the method is applied to a device in an LAA-LTE system. Referring to FIG. 1, the method includes the following steps.

101. The device determines a first value.

Optionally, the first value may be randomly obtained.

102. The device determines a first signal sending moment according to the first value.

Optionally, the device calculates $X_1$ according to a formula $X_1 = \mathrm{mod}(X, N)$; the device divides $0, 1, \ldots, N-1$ into M groups, where each group is corresponding to a signal sending moment; and the device selects a signal sending moment of a group in which $X_1$ is located as the first signal sending moment, where mod( ) is a modulo function, X is the first value, N is a positive integer greater than 1, X and M are positive integers, and $N \geq M$.

103. The device determines whether a CCA end moment is the first signal sending moment.

Optionally, a time interval between the first signal sending moment and a start moment of a next OFDM symbol is greater than one CCA cycle. The CCA cycle is a minimal time unit of a channel assessment.

Figure 2:
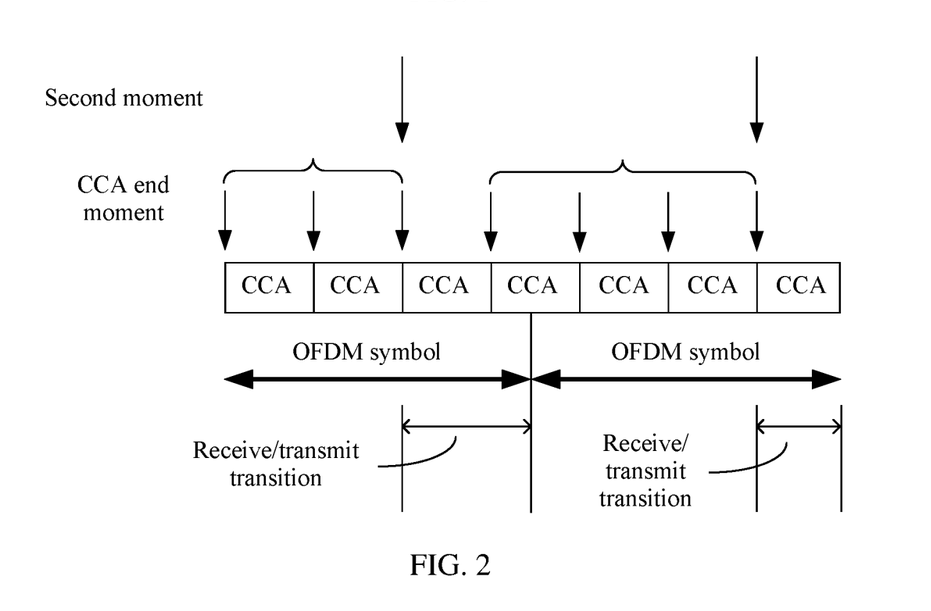
FIG. 2 is a schematic diagram of a location of a first signal sending moment according to an embodiment of the present invention.

Preferably, after determining that a channel is idle, the device determines whether the CCA end moment is the first moment. In addition, preferably, two OFDM symbols include seven CCA cycles, and the first signal sending moment may be a start moment of the third CCA cycle in the seven CCA cycles or a start moment of the seventh CCA cycle in the seven CCA cycles. Referring to FIG. 2, a signal starts to be sent at the start moment of the third CCA cycle, and receive/transmit transition may be performed during a time interval between the start moment of the third CCA cycle and the start moment of the next OFDM symbol without affecting sending of the next OFDM symbol. The same is true for the start moment of the seventh CCA cycle. This also ensures that a time interval between a signal sending moment and the start moment of the next OFDM symbol is sufficient for completing receive/transmit transition without affecting the sending of the next OFDM symbol, thereby avoiding a waste of resources caused during the receive/transmit transition.

104. If the CCA end moment is the first signal sending moment, the device sends a signal at the first signal sending moment.

Optionally, if the CCA end moment is not the first signal sending moment, the device re-performs a CCA.

According to the signal sending method provided in this embodiment of the present invention, a device determines a first value; the device determines a first signal sending moment according to the first value; the device determines whether a CCA end moment is the first signal sending moment; and if the CCA end moment is the first signal sending moment, the device sends a signal at the first signal sending moment. Because whether the CCA end moment is the first sending moment is determined before the signal is sent, a prior-art problem that a channel occupancy collision is caused if multiple devices simultaneously detect, by means of listening, that a channel is idle and simultaneously send data is resolved.

Figure 3:
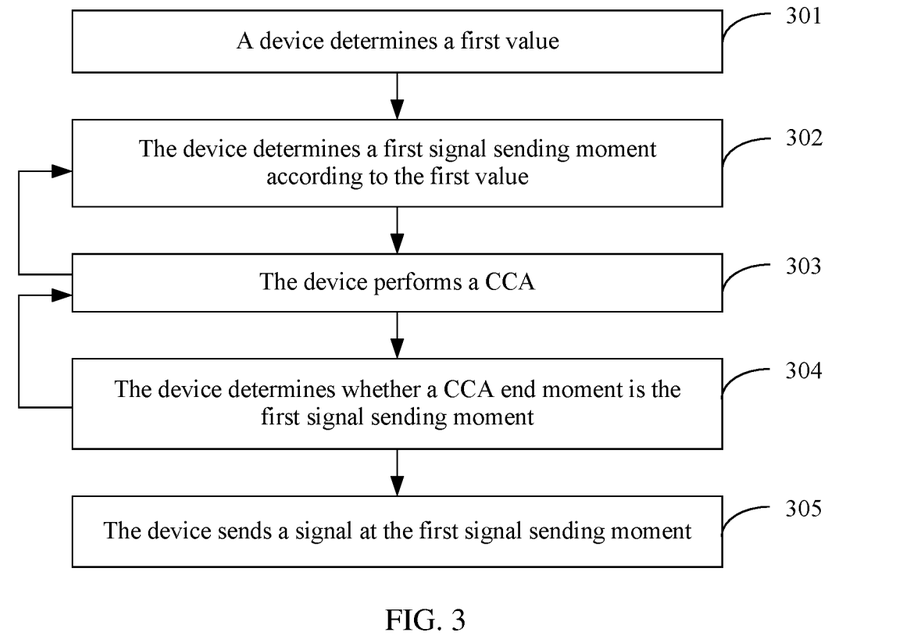
FIG. 3 is a schematic flowchart of a signal sending method according to another embodiment of the present invention.

Based on the foregoing embodiment corresponding to FIG. 1, another embodiment of the present invention provides a signal sending method. Preferably, the method is applied to an LAA-LTE system. That two OFDM symbols include seven CCA cycles is used as an example for description in this embodiment. In this embodiment, end moments of the seven CCA cycles included in the two OFDM symbols are respectively represented by seven numbers: 0, 1, 2, 3, 4, 5, and 6, and all time points are described by using the seven moments. Preferably, a CCA cycle is 20 microseconds. Referring to FIG. 3, the method includes the following steps.

301. A device determines a first value.

Optionally, the first value may be randomly obtained.

302. The device determines a first signal sending moment according to the first value.

Optionally, the device calculates $X_1$ according to a formula $X_1 = \mathrm{mod}(X, N)$; the device divides $0, 1, \ldots, N-1$ into M groups, where each group is corresponding to a signal sending moment; and the device selects a signal sending moment of a group in which $X_1$ is located as the first signal sending moment, where mod( ) is a modulo function, X is the first value, N is a positive integer greater than 1, X and M are positive integers, and N≥M.

Specifically, optionally, in a first application scenario, N is 7, and M is 2; and a first group includes {0, 1, 2}, and a signal sending moment corresponding to the first group is Y=7×floor(X/N)+2; and a second group includes {3, 4, 5, 6}, and a signal sending moment corresponding to the second group is Y=7×floor(X/N)+6, where floor( ) is a floor function.

In this case, the device may calculate a first value $X_1$ according to a first formula $X_1$=mod(X,7), where $X_1$ is a remainder obtained by dividing a first value X by 7; and the device may further calculate a second value $X_2$ according to a second formula $X_2$=floor(X/7), where $X_2$ is a quotient obtained by dividing a first value X by 7.

When the first value belongs to {0, 1, 2}, the device performs, according to a third formula Y=7×$X_2$+2, calculation to obtain a first signal sending moment Y; or when the first value belongs to {3, 4, 5, 6}, the device performs, according to a fourth formula Y=7×$X_2$+6, calculation to obtain a first signal sending moment Y.

Further, optionally, the foregoing process of calculating the first signal sending moment may be implemented by using the following code: $X_1$=mod(X,7), and $X_2$=floor(X/7); and if $X_1$ belongs to {0, 1, 2}, Y=7*$X_2$+2; or If $X_1$ belongs to {3, 4, 5, 6}, Y=7*$X_2$+6.

Optionally, in a second application scenario, N is 7, and M is 3; a first group includes {0}, and a signal sending moment corresponding to the first group is Y=7×floor(X/N); a second group includes {1, 2, 3}, and a signal sending moment corresponding to the second group is Y=7×floor (X/N)+3 and a third group includes {4, 5, 6}, and a signal sending moment corresponding to the third group is Y=7×floor(X/N)+7, where floor( ) is a floor function.

In this case, the device may calculate a first value $X_1$ according to a first formula $X_1$=mod(X,7); and the device may further calculate a second value $X_2$ according to a second formula $X_2$=floor(X/7).

When the first value belongs to {0}, the device determines a first signal sending moment Y according to a fifth formula Y=7×$X_2$; or when the first value belongs to {1, 2, 3}, the device determines a first signal sending moment Y according to a sixth formula Y=7×$X_2$+3; or when the first value belongs to {4, 5, 6}, the device determines a first signal sending moment Y according to a seventh formula Y=7×$X_2$+7.

Further, optionally, the foregoing process of calculating the first signal sending moment may be implemented by using the following code:

$X_1$=mod(X,7), and $X_2$=floor(X/7); and
if $X_1$ belongs to {0}, Y=7*$X_2$; or
if $X_1$ belongs to {1, 2, 3}, Y=7*$X_2$+3; or
If $X_1$ belongs to {4, 5, 6}, Y=7*$X_2$+7.

Certainly, only two specific application scenarios are listed herein, and it does not indicate that the present invention is limited thereto.

Optionally, the signal sending method provided in this embodiment further includes step 303.

303. The device performs a CCA.

Optionally, if an assessment result of the CCA is that a channel is idle, step 304 is performed.

If an assessment result of the CCA is that a channel is not idle, the device increases the first value by 1, and performs step 302 again.

Optionally, when the assessment result of the CCA is that the channel is idle, the signal sending method provided in this embodiment further includes:

304. The device determines whether a CCA end moment is the first signal sending moment.

Optionally, after step 303, if the CCA end moment is not the first signal sending moment, the device re-performs a CCA, that is, step 303 is performed again.

If the CCA end moment is the first signal sending moment, step 305 is performed.

305. The device sends a signal at the first signal sending moment.

Optionally, based on the foregoing steps 302 to 305, in an application scenario, if the CCA end moment is not the first signal sending moment, the device re-performs the CCA; if the assessment result of the CCA is that the channel is idle, the device determines whether the CCA end moment is the first signal sending moment; and if the CCA end moment is the first signal sending moment, the device sends the signal at the first signal sending moment.

In another application scenario, if the CCA end moment is not the first signal sending moment, the device re-performs the CCA; and if the assessment result of the CCA is that the channel is not idle, the device increases the first value by 1.

According to the signal sending method provided in this embodiment of the present invention, a device determines a first value; the device determines a first signal sending moment according to the first value; if an assessment result of a CCA is that a channel is idle, the device determines whether a CCA end moment is the first signal sending moment; and if the CCA end moment is the first signal sending moment, the device starts to send a signal at the first moment. Because whether the CCA end moment is the first sending moment is determined before the signal is sent, a prior-art problem that a channel occupancy collision is caused if multiple devices simultaneously detect, by means of listening, that a channel is idle and simultaneously send data is resolved.

Figure 4:
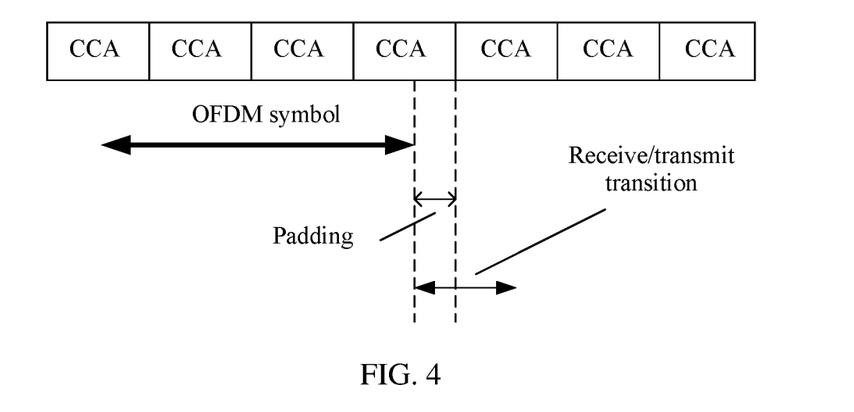
FIG. 4 is a schematic structural diagram of a CCA cycle and an OFDM symbol in the prior art.
Figure 5:
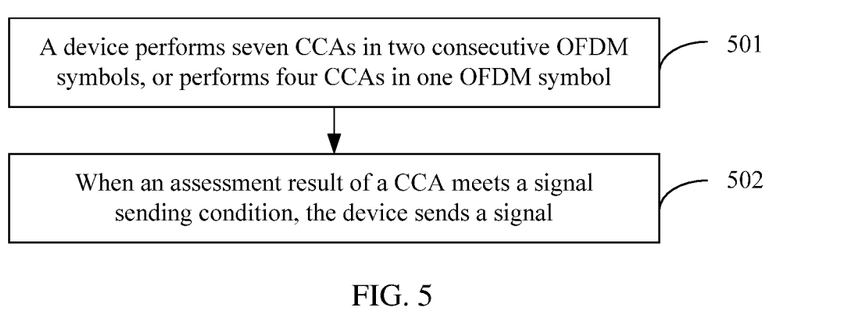
FIG. 5 is another signal sending method according to an embodiment of the present invention.

An embodiment of the present invention provides another signal sending method, which may be applied to the signal sending method described in the foregoing embodiment corresponding to FIG. 1 or FIG. 3. In the prior art, because a time resource occupied in an OFDM (Orthogonal Frequency Division Multiplexing) symbol is not an integer quantity of CCA cycles, a CCA end moment is different from a start moment of the OFDM symbol, or a CCA end moment is different from an end moment of the OFDM symbol, or both a CCA start moment and a CCA end moment are different from a start moment and an end moment that are of the OFDM symbol. As shown in FIG. 4, a device has a transition process that is of a CCA cycle and that is between received data and sent data. When a time interval between the start moment of the OFDM symbol and the CCA end moment is less than the CCA cycle, the OFDM symbol is occupied to perform receive/transmit transition. Consequently, resources of an entire OFDM symbol are wasted. Referring to FIG. 5, the signal sending method provided in this embodiment is used to resolve the foregoing problem, and includes the following steps.

501. A device performs seven CCAs in two consecutive OFDM symbols, or performs four CCAs in one OFDM symbol.

The two OFDM symbols include seven CCA cycles.

Figure 6:
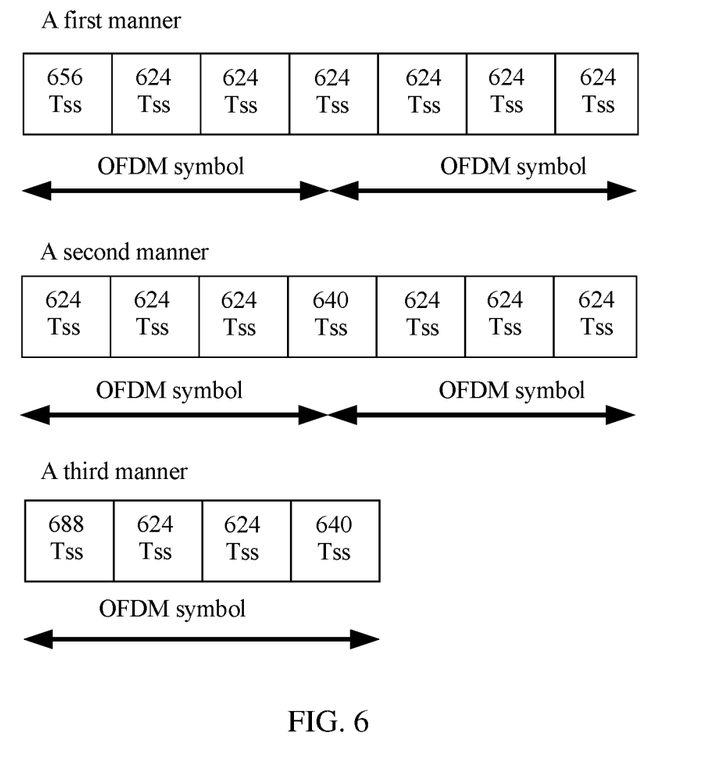
FIG. 6 is a schematic structural diagram of a CCA according to an embodiment of the present invention.

It should be noted that, in this embodiment, the two OFDM symbols include seven CCA cycles, and a length of a CCA cycle in the prior art is reset. As shown in FIG. 6, three manners are included. Certainly, the three manners are merely used as examples for description, and it does not indicate that the present invention is limited thereto. The three manners are designed based on a Ts (Sampling Time).

A first manner: If one of the two OFDM symbols includes 2208 Tss, and the other OFDM symbol includes 2192 Tss, a time length of one CCA in the seven CCAs is 656 Tss, and a time length of each of the remaining six CCAs is 624 Tss.

A second manner: If each of the two OFDM symbols includes 2192 Tss, a time length of one CCA in the seven CCAs is 640 Tss, and a time length of each of the remaining six CCAs is 624 Tss.

A third manner: If the OFDM symbol includes 2560 Tss, a time length of one CCA in the four CCAs is 688 Tss, and a time length of each of the remaining three CCAs is 624 Tss.

In this way, two OFDM symbols may include an integer quantity of CCA cycles, or an OFDM symbol includes an integer quantity of CCA cycles.

502. When an assessment result of a CCA meets a signal sending condition, the device sends a signal.

Figure 7:
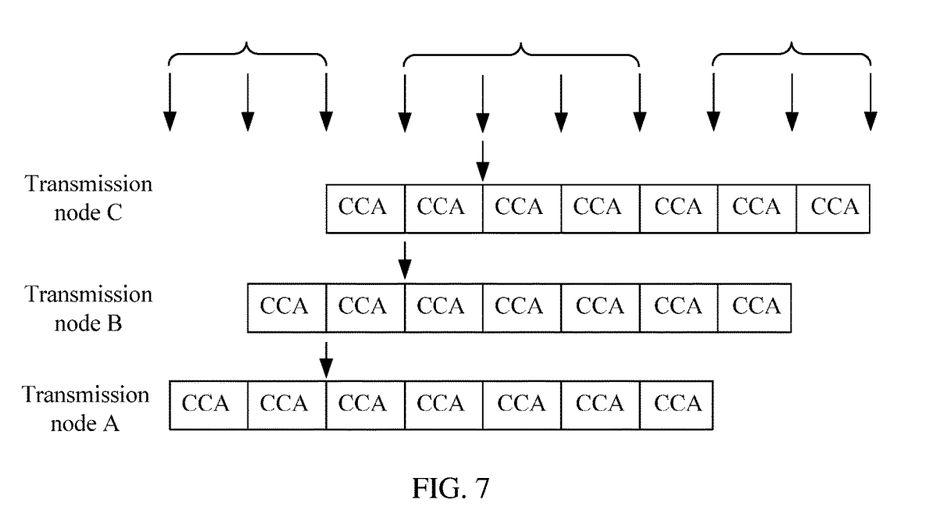
FIG. 7 is a schematic diagram of a signal sending moment according to an embodiment of the present invention.

Optionally, a moment at which the device sends the signal is different from a moment at which another device sends the signal. Further, preferably, an interval between the moment at which the device sends the signal and the moment at which the another device sends the signal is one CCA cycle. For example, preferably, in a scenario in which multiple devices preempt a channel, second moments of all devices are staggered from each other by one CCA cycle. As shown in FIG. 7, an actual sending moment of a device B is one CCA cycle later than an actual sending moment of a device A, and an actual sending moment of a device C is one CCA cycle later than the actual sending moment of the device B. In this way, the device A, the device B, and the device C always start to send a signal at three different moments, so that a problem that two nodes simultaneously preempt the channel does not occur, thereby avoiding a channel collision to some extent.

According to the signal sending method provided in this embodiment of the present invention, a device performs seven CCAs in two consecutive OFDM symbols, or performs four CCAs in one OFDM symbol. When an assessment result of a CCA meets a signal sending condition, the device sends a signal. Because the two OFDM symbols may include an integer quantity of CCA cycles, or the OFDM symbol includes an integer quantity of CCA cycles, a prior-art problem that resources are wasted because a CCA end moment is different from a start moment of the OFDM symbol is resolved.

Figure 8:
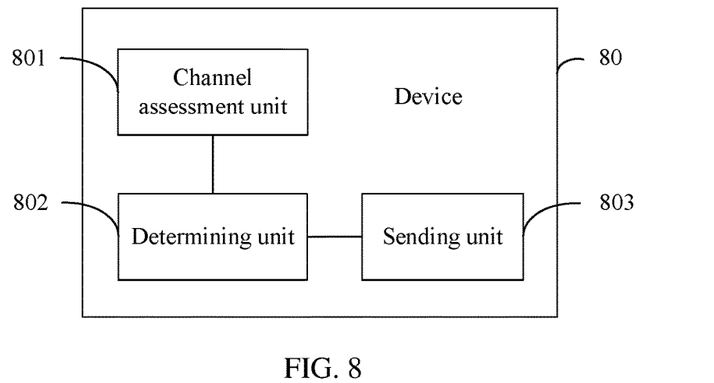
FIG. 8 is a schematic structural diagram of a device according to an embodiment of the present invention.

Based on the foregoing embodiments corresponding to FIG. 1 and FIG. 3, an embodiment of the present invention provides a device, which is configured to perform the signal sending methods described in the foregoing embodiments corresponding to FIG. 1 and FIG. 3. Referring to FIG. 8, the device 80 includes a channel assessment unit 801, a determining unit 802, and a sending unit 803.

The channel assessment unit 801 is configured to determine a first value, and determine a first signal sending moment according to the first value.

The determining unit 802 is configured to determine whether a clear channel assessment CCA end moment is the first signal sending moment determined by the channel assessment unit 801.

The sending unit 803 is configured to: when a result determined by the determining unit 802 is that the clear channel assessment CCA end moment is the first signal sending moment, send a signal at the first signal sending moment.

Optionally, the channel assessment unit 801 is specifically configured to: calculate $X_1$ according to a formula $X_1=\mathrm{mod}(X,N)$; divide $0, 1, \ldots, N-1$ into M groups, where each group is corresponding to a signal sending moment; and select a signal sending moment of a group in which $X_1$ is located as the first signal sending moment, where mod( ) is a modulo function, X is the first value, N is a positive integer greater than 1, X and M are positive integers, and N≥M.

Further, optionally, in an application scenario: N is 7, and M is 2. A first group includes $\{0, 1, 2\}$, and a signal sending moment corresponding to the first group is $Y=7\times\mathrm{floor}(X/N)+2$. A second group includes $\{3, 4, 5, 8\}$, and a signal sending moment corresponding to the second group is $Y=7\times\mathrm{floor}(X/N)+6$, where floor( ) is a floor function.

In another application scenario: N is 7, and M is 3. A first group includes $\{0\}$, and a signal sending moment corresponding to the first group is $Y=7\times\mathrm{floor}(X/N)$. A second group includes $\{1, 2, 3\}$, and a signal sending moment corresponding to the second group is $Y=7\times\mathrm{floor}(X/N)+3$. A third group includes $\{4, 5, 8\}$, and a signal sending moment corresponding to the third group is $Y=7\times\mathrm{floor}(X/N)+7$, where floor( ) is a floor function.

Optionally, the channel assessment unit 801 is further configured to: when the clear channel assessment CCA end moment is not the first signal sending moment, re-perform a clear channel assessment.

The determining unit 802 is further configured to: when an assessment result of the channel assessment unit 801 is that a channel is idle, determine whether the clear channel assessment CCA end moment is the first signal sending moment.

The sending unit 803 is further configured to: when the result determined by the determining unit 802 is that the clear channel assessment CCA end moment is the first signal sending moment, send the signal at the first signal sending moment.

The channel assessment unit 801 is further configured to: when the clear channel assessment CCA end moment is not the first signal sending moment, re-perform a clear channel assessment; and if an assessment result of the clear channel assessment CCA is that a channel is not idle, increase the first value by 1.

The device provided in this embodiment of the present invention determines a first value, determines a first signal sending moment according to the first value, determines whether a CCA end moment is the first signal sending moment, and sends a signal at the first signal sending moment if the CCA end moment is the first signal sending moment. Because whether the CCA end moment is the first sending moment is determined before the signal is sent, a prior-art problem that a channel occupancy collision is caused if multiple devices simultaneously detect, by means of listening, that a channel is idle and simultaneously send data is resolved.

Figure 9:
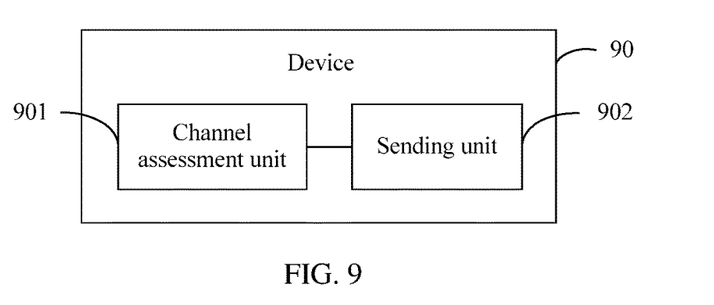
FIG. 9 is a schematic structural diagram of another device according to an embodiment of the present invention.

Based on the foregoing embodiment corresponding to FIG. 5, an embodiment of the present invention provides another device, which is configured to perform the signal sending method described in the foregoing embodiment corresponding to FIG. 5. Referring to FIG. 9, the device 90 includes a channel assessment unit 901 and a sending unit 902.

The channel assessment unit 901 is configured to: perform seven clear channel assessments CCAs in two consecutive orthogonal frequency division multiplexing OFDM symbols, or perform four clear channel assessments CCAs in one orthogonal frequency division multiplexing OFDM symbol.

It should be noted that, in this embodiment, the two OFDM symbols include seven CCA cycles, and a length of a CCA cycle in the prior art is reset. As shown in FIG. 6, three manners are included. Certainly, the three manners are merely used as examples for description, and it does not indicate that the present invention is limited thereto. The three manners are designed based on a Ts (Sampling Time).

A first manner: If one of the two OFDM symbols includes 2208 Tss, and the other OFDM symbol includes 2192 Tss, a time length of one CCA in the seven CCAs is 656 Tss, and a time length of each of the remaining six CCAs is 624 Tss.

A second manner: If each of the two OFDM symbols includes 2192 Tss, a time length of one CCA in the seven CCAs is 640 Tss, and a time length of each of the remaining six CCAs is 624 Tss.

A third manner: If the OFDM symbol includes 2560 Tss, a time length of one CCA in the four CCAs is 688 Tss, and a time length of each of the remaining three CCAs is 624 Tss.

In this way, two OFDM symbols may include an integer quantity of CCA cycles, or an OFDM symbol includes an integer quantity of CCA cycles.

The sending unit 902 is configured to: when an assessment result of the channel assessment unit 901 meets a signal sending condition, send a signal.

Optionally, a moment at which the device sends the signal is different from a moment at which another device sends the signal. Further, preferably, an interval between the moment at which the device sends the signal and the moment at which the another device sends the signal is one CCA cycle.

The device provided in this embodiment of the present invention performs seven CCAs in two consecutive OFDM symbols, or performs four CCAs in one OFDM symbol. When an assessment result of a CCA meets a signal sending condition, the device sends a signal. Because the two OFDM symbols may include an integer quantity of CCA cycles, or the OFDM symbol includes an integer quantity of CCA cycles, a prior-art problem that resources are wasted because a CCA end moment is different from a start moment of the OFDM symbol is resolved.

Figure 10:
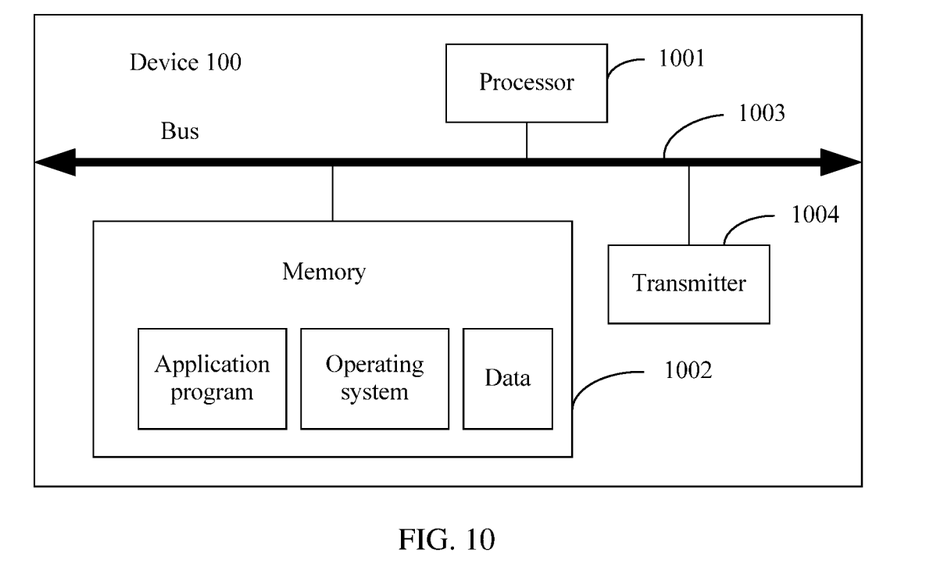
FIG. 10 is a schematic structural diagram of a device according to another embodiment of the present invention.

Based on the foregoing embodiments corresponding to FIG. 1 and FIG. 3, another embodiment of the present invention provides a device, which is configured to perform the signal sending methods described in the foregoing embodiments corresponding to FIG. 1 and FIG. 3. Referring to FIG. 10, the device 100 includes at least one processor 1001, a memory 1002, a bus 1003, and a transmitter 1004. The at least one processor 1001, the memory 1002, and the transmitter 1004 are connected and complete mutual communication by using the bus 1003.

The bus 1003 may be an ISA (Industry Standard Architecture) bus, a PCI (Peripheral Component) bus, an EISA (Extended Industry Standard Architecture) bus, or the like. The bus 1003 may be classified into an address bus, a data bus, a control bus, and the like. For ease of representation, only one thick line is used in FIG. 10 to represent the bus, but it does not indicate that there is only one bus or one type of bus.

The memory 1002 is configured to store application program code used to execute the solutions of the present invention, where the application program code used to execute the solutions of the present invention is stored in memory, and execution of the application program code is controlled by the processor 1001.

The memory may be a read-only memory ROM, a static storage device of another type that may store static information and instructions, a random access memory RAM, or a dynamic storage device of another type that may store information and instructions, or may be an electrically erasable programmable read-only memory EEPROM, a compact disc read-only memory CD-ROM, another compact disc storage, an optical disc storage (including a compact disc, a laser disc, an optical disc, a digital versatile disc, a Blu-ray disc, and the like), a disk storage medium, another magnetic storage device, or any other medium that can be configured to carry or store expected program code in a form of an instruction or a data structure and can be accessed by a computer, but this is not limited herein. These memories are connected to the processor by using the bus.

The processor 1001 may be a central processing unit (CPU for short) 1001, an application-specific integrated circuit (ASIC for short), or one or more integrated circuits configured to implement the embodiments of the present invention.

The processor 1001 is configured to call the program code in the memory 1002. In a possible implementation, when the foregoing application program is executed by the processor 1001, the following functions are implemented.

The processor 1001 is configured to: determine a first value, and determine a first signal sending moment according to the first value; and determine whether a clear channel assessment CCA end moment is the first signal sending moment.

The transmitter 1004 is configured to: when a result determined by the processor 1001 is that the clear channel assessment CCA end moment is the first signal sending moment, send a signal at the first signal sending moment.

Optionally, the processor 1001 is specifically configured to: calculate $X_1$ according to a formula $X_1=\mod(X,N)$ divide 0, 1, . . . , N−1 into M groups, where each group is corresponding to a signal sending moment; and select a signal sending moment of a group in which $X_1$ is located as the first signal sending moment, where mod( ) is a modulo function, X is the first value, N is a positive integer greater than 1, X and M are positive integers, and N≥M.

Further, optionally, in an application scenario: N is 7, and M is 2. A first group includes {0, 1, 2}, and a signal sending moment corresponding to the first group is $Y=7\times\text{floor}(X/N)+2$. A second group includes {3, 4, 5, 6}, and a signal sending moment corresponding to the second group is $Y=7\times\text{floor}(X/N)+6$, where floor( ) is a floor function.

In another application scenario: N is 7, and M is 3. A first group includes {0}, and a signal sending moment corresponding to the first group is $Y=7\times\text{floor}(X/N)$ A second group includes {1, 2, 3}, and a signal sending moment corresponding to the second group is $Y=7\times\text{floor}(X/N)+3$. A third group includes {4, 5, 6}, and a signal sending moment corresponding to the third group is $Y=7\times\text{floor}(X/N)+7$, where floor( ) is a floor function.

Optionally, the processor 1001 is further configured to: when the clear channel assessment CCA end moment is not the first signal sending moment, re-perform a clear channel assessment; and when an assessment result is that a channel is idle, determine whether the clear channel assessment CCA end moment is the first signal sending moment.

The transmitter 1004 is further configured to: when the result determined by the processor 1001 is that the clear channel assessment CCA end moment is the first signal sending moment, send the signal at the first signal sending moment.

The processor 1001 is further configured to: when the clear channel assessment CCA end moment is not the first signal sending moment, re-perform a clear channel assessment; and if an assessment result of the clear channel assessment CCA is that a channel is not idle, increase the first value by 1.

The device provided in this embodiment of the present invention determines a first value, determines a first signal sending moment according to the first value, determines whether a CCA end moment is the first signal sending moment, and sends a signal at the first signal sending moment if the CCA end moment is the first signal sending moment. Because whether the CCA end moment is the first sending moment is determined before the signal is sent, a prior-art problem that a channel occupancy collision is caused if multiple devices simultaneously detect, by means of listening, that a channel is idle and simultaneously send data is resolved.

Figure 11:
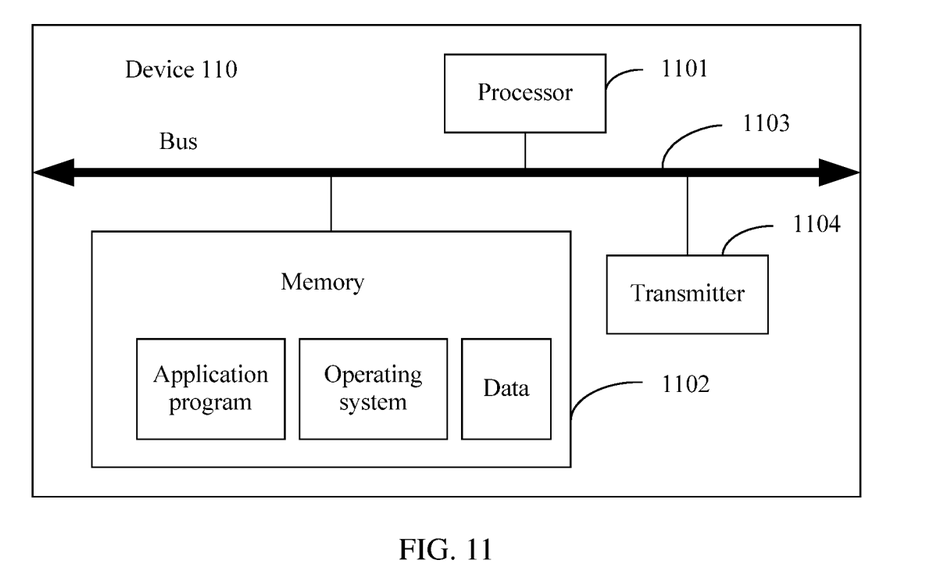
FIG. 11 is a schematic structural diagram of another device according to another embodiment of the present invention.

Based on the foregoing embodiment corresponding to FIG. 5, another embodiment of the present invention provides another device, which is configured to perform the signal sending method described in the foregoing embodiment corresponding to FIG. 5. Referring to FIG. 11, the device 110 includes at least one processor 1101, a memory 1102, a bus 1103, and a transmitter 1104. The at least one processor 1101, the memory 1102, and the transmitter 1104 are connected and complete mutual communication by using the bus 1103.

The bus 1103 may be an ISA (Industry Standard Architecture) bus, a PCI (peripheral component interconnect) bus, an EISA (Extended Industry Standard Architecture) bus, or the like. The bus 1103 may be classified into an address bus, a data bus, a control bus, and the like. For ease of representation, only one thick line is used in FIG. 11 to represent the bus, but it does not indicate that there is only one bus or one type of bus.

The memory 1102 is configured to store application program code used to execute the solutions of the present invention, where the application program code used to execute the solutions of the present invention is stored in the memory, and execution of the application program code is controlled by the processor 1101

The memory may be a read-only memory ROM, a static storage device of another type that may store static information and instructions, a random access memory RAM, or a dynamic storage device of another type that may store information and instructions, or may be an electrically erasable programmable read-only memory EEPROM, a compact disc read-only memory CD-ROM, another compact disc storage, an optical disc storage (including a compact disc, a laser disc, an optical disc, a digital versatile disc, a Blu-ray disc, and the like), a disk storage medium, another magnetic storage device, or any other medium that can be configured to carry or store expected program code in a form of an instruction or a data structure and can be accessed by a computer, but this is not limited herein. These memories are connected to the processor by using the bus.

The processor 1101 may be a central processing unit (CPU for short) 1101, an application-specific integrated circuit (ASIC for short), or one or more integrated circuits configured to implement the embodiments of the present invention.

The processor 1101 is configured to call the program code in the memory 1102. In a possible implementation, when the foregoing application program is executed by the processor 1101, the following functions are implemented.

The processor 1101 is configured to: perform seven clear channel assessments CCAs in two consecutive orthogonal frequency division multiplexing OFDM symbols, or perform four clear channel assessments CCAs in one orthogonal frequency division multiplexing OFDM symbol.

It should be noted that, in this embodiment, the two OFDM symbols include seven CCA cycles, and a length of a CCA cycle in the prior art is reset. As shown in FIG. 6, three manners are included. Certainly, the three manners are merely used as examples for description, and it does not indicate that the present invention is limited thereto. The three manners are designed based on a Ts (Sampling Time).

A first manner: If one of the two OFDM symbols includes 2208 Tss, and the other OFDM symbol includes 21112 Ts, a time length of one CCA in the seven CCAs is 656 Tss, and a time length of each of the remaining six CCAs is 624 Tss.

A second manner: If each of the two OFDM symbols includes 21112 Tss, a time length of one CCA in the seven CCAs is 640 Tss, and a time length of each of the remaining six CCAs is 624 Tss.

A third manner: If the OFDM symbol includes 2560 Tss, a time length of one CCA in the four CCAs is 688 Tss, and a time length of each of the remaining three CCAs is 624 Tss.

In this way, two OFDM symbols may include an integer quantity of CCA cycles, or an OFDM symbol includes an integer quantity of CCA cycles.

The transmitter 1102 is configured to: when an assessment result of the processor 1101 meets a signal sending condition, send a signal.

Optionally, a moment at which the device sends the signal is different from a moment at which another device sends the signal. Further, preferably, an interval between the moment at which the device sends the signal and the moment at which the another device sends the signal is one CCA cycle.

The device provided in this embodiment of the present invention performs seven CCAs in two consecutive OFDM symbols, or performs four CCAs in one OFDM symbol. When an assessment result of a CCA meets a signal sending condition, the device sends a signal. Because the two OFDM symbols may include an integer quantity of CCA cycles, or the OFDM symbol includes an integer quantity of CCA cycles, a prior-art problem that resources are wasted because a CCA end moment is different from a start moment of the OFDM symbol is resolved.

In addition, a computer readable medium is provided, including a computer readable instruction used to perform the following operations when being executed: performing the operations of 101 to 104, 301 to 305, or 501 and 502 in the methods of the foregoing embodiments.

In addition, a computer program product is provided, including the foregoing computer readable medium.

It should be noted that signaling mentioned in this specification includes but is not limited to an instruction, information, a signal, a message, or the like. This is not limited herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit.

When the functions are implemented in the form of a software function unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

With descriptions of the foregoing embodiments, a person skilled in the art may clearly understand that the present invention may be implemented by hardware, firmware or a combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a computer. The following is used as an example but is not limited: The computer readable medium may include a RAM (Random Access Memory), a ROM (Read-Only Memory), an EEPROM (Electrically Erasable Programmable Read-Only Memory), a CD-ROM (Compact Disc Read-Only Memory), another optical disc storage, a disk storage medium, another magnetic storage device, or any other medium that can be used to carry or store expected program code in a form of an instruction or a data structure and can be accessed by a computer. In addition, any connection may be appropriately defined as a computer readable medium. For example, if software is transmitted from a website, a server or another remote source by using a coaxial cable, an optical fiber/cable, a twisted pair, a DSL (Digital Subscriber Line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by the present invention include a CD (Compact Disc), a laser disc, an optical disc, a DVD disc (Digital Versatile Disc), a floppy disk and a Blu-ray disc, where the disk generally copies data by a magnetic means, and the disc copies data optically by a laser means. The foregoing combination should also be included in the protection scope of the computer readable medium.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, performed by a device, the method comprising:
grouping, by the device, 0, 1, . . . , N−1 into M groups, wherein each group of the M groups corresponds to a respective signal sending moment of a plurality of signal sending moments, and wherein N is a positive integer greater than 1, M is a positive integer greater than 1, and N≥M;
determining, by the device, a first value;
determining, by the device, a first signal sending moment of the plurality of signal sending moments according to the first value;
determining, by the device, whether a clear channel assessment (CCA) end moment is the first signal sending moment; and
when the CCA end moment is the first signal sending moment, sending, by the device, a signal at the first signal sending moment.

2. The method according to claim 1, wherein determining, by the device, the first signal sending moment according to the first value comprises:
calculating, by the device, $X_1$ according to a relation $X_1=\mathrm{mod}(X,N)$; and selecting, by the device, the first signal sending moment, wherein the first signal sending moment corresponds to a group of the M groups in which $X_1$, is located;

wherein mod( ) is a modulo function, $X_1$, is the first value, and X is a positive integer.

3. The method according to claim 2, wherein:

N is 7, and M is 2;

a first group of the M groups comprises {0, 1, 2}, and a respective signal sending moment of the plurality of signal sending moments corresponding to the first group is $Y=7 \times floor(X/N)+2$;

a second group of the M groups comprises {3, 4, 5, 6}, and a respective signal sending moment of the plurality of signal sending moments corresponding to the second group is $Y=7 \times floor(X/N)+6$; and floor( ) is a floor function.

4. The method according to claim 2, wherein:

N is 7, and M is 3;

a first group of the M groups comprises {0}, and a respective signal sending moment of the plurality of signal sending moments corresponding to the first group is $Y=7 \times floor(X/N)$;

a second group of the M groups comprises {1, 2, 3}, and a respective signal sending moment of the plurality of signal sending moments corresponding to the second group is $Y=7 \times floor(X/N)+3$;

a third group of the M groups comprises {4, 5, 6}, and a respective signal sending moment of the plurality of signal sending moments corresponding to the third group is $Y=7 \times floor(X/N)+7$; and floor( ) is a floor function.

5. The method according to claim 1, further comprising:

when the CCA end moment is not the first signal sending moment, re-performing, by the device, a CCA;

when an assessment result of the CCA is that a channel is idle, determining, by the device, whether the CCA end moment is the first signal sending moment; and when the CCA end moment is the first signal sending moment, sending, by the device, the signal at the first signal sending moment.

6. The method according to claim 1, further comprising:

when the CCA end moment is not the first signal sending moment, re-performing, by the device, a CCA; and when an assessment result of the CCA is that a channel is not idle, increasing, by the device, the first value by 1.

7. A method, performed by a device, the method comprising:

performing, by the device, seven clear channel assessments (CCAs) in two consecutive orthogonal frequency division multiplexing (OFDM) symbols, or performing four clear channel assessments (CCAs) in one orthogonal frequency division multiplexing (OFDM) symbol; and when an assessment result of a clear channel assessment (CCA) meets a signal sending condition, sending, by the device, a signal; and wherein a time length of at least two CCAs of the seven CCAs is 624 sampling time points, or wherein a time length of at least two CCAs of the four CCAs is 624 sampling time points.

8. The method according to claim 7, comprising:

when one of the two OFDM symbols comprises 2208 sampling time points, and the other OFDM symbol comprises 2192 sampling time points, a time length of one CCA in the seven CCAs is 656 sampling time points, and a time length of each of the remaining six CCAs is 624 sampling time points.

9. The method according to claim 7, wherein:

when each of the two OFDM symbols comprises 2192 sampling time points, a time length of one CCA in the seven CCAs is 640 sampling time points, and a time length of each of the remaining six CCAs is 624 sampling time points.

10. The method according to claim 7, wherein, when the OFDM symbol comprises 2560 sampling time points, a time length of one CCA in the four CCAs is 688 sampling time points, and a time length of each of the remaining three CCAs is 624 sampling time points.

11. The method according to claim 7, wherein:

a moment at which the device sends the signal is different from a moment at which another device sends the signal.

12. The method according to claim 11, wherein:

an interval between the moment at which the device sends the signal and the moment at which the another device sends the signal is one CCA cycle.

13. A device, comprising:

a processor;

a memory; and a transmitter;

wherein the processor is configured to:

grouping 0, 1, . . . , N−1 into M groups, wherein each group of the M groups corresponds to a respective signal sending moment of a plurality of signal sending moments, and wherein N is a positive integer greater than 1, M is a positive integer greater than 1, and N≥M;

determine a first value, and determine a first signal sending moment of the plurality of signal sending moments according to the first value; and determine whether a clear channel assessment (CCA) end moment is the first signal sending moment; and wherein the transmitter is configured to, when a result determined by the processor is that the CCA end moment is the first signal sending moment, send a signal at the first signal sending moment.

14. The device according to claim 13, wherein the processor is further configured to:

calculate $X_1$ according to a relation $X_1=mod(X,N)$; and select the first signal sending moment, wherein the first signal sending moment corresponds to a group of the M groups in which $X_1$ is located;

wherein mod( ) is a modulo function, $X_1$ is the first value, and X is a positive integer.

15. The device according to claim 13, wherein the processor is further configured to:

when the CCA end moment is not the first signal sending moment, re-perform a clear channel assessment; and when an assessment result of the CCA is that a channel is idle, determine whether the CCA end moment is the first signal sending moment;

wherein the transmitter is further configured to, when the result determined by the processor is that the CCA end moment is the first signal sending moment, send the signal at the first signal sending moment.

16. The device according to claim 13, wherein the processor is further configured to:

when the CCA end moment is not the first signal sending moment, re-perform a CCA; and when an assessment result of the CCA is that a channel is not idle, increase the first value by 1.

* * * * *